United States Patent

[11] 3,554,295

[72] Inventor Arnold F. Kopaska
 Guthrie Center, Iowa 50115
[21] Appl. No. 668,770
[22] Filed Sept. 19, 1967
[45] Patented Jan. 12, 1971

[54] IMPLEMENT TRANSPORT
 7 Claims, 6 Drawing Figs.
[52] U.S. Cl. .................................................. 172/398,
 172/417, 172/456,
[51] Int. Cl. ................................................... A01b 63/22
[50] Field of Search .......................................... 172/316,
 456, 311, 417, 413, 398, 397, 502

[56] References Cited
 UNITED STATES PATENTS
| | | | |
|---|---|---|---|
| 1,105,022 | 7/1914 | Campbell | 172/456X |
| 2,638,045 | 5/1953 | Heitshu | 172/316 |
| 3,169,027 | 2/1965 | Oerman | 172/456X |
| 3,235,013 | 2/1966 | Kirkpatrick | 172/413 |
| 3,298,446 | 1/1967 | Anderson | 172/456 |
| 3,362,483 | 1/1968 | Twidale | 172/456X |
| 3,255,830 | 6/1966 | Groenke | 172/456 |

Primary Examiner—Robert E. Pulfrey
Assistant Examiner—Alan E. Kopecki
Attorney—Dick, Zarley, McKee & Thomte ABSTRACT: A transport device for implements carried on the front end by the lift arms of a tractor and on its rear end by a single ground support wheel, a hydraulic cylinder operatively connected to a pair of parallel members interconnecting the transport frame to the rear wheel for lowering and raising the transport frame whereby the implement is moved into and out of engagement with the ground. A wing unit may be provided at opposite ends of the transport frame for pivotal movement between lowered and raised positions and being operatively connected to the common power means for raising and lowering the implement whereby the wings are raised and lowered simultaneously with the lowering and raising of the implement.

PATENTED JAN12 1971

INVENTOR
ARNOLD F. KOPASKA

BY
Dick, Zarley, McKee & Thomte
ATTORNEYS

INVENTOR
ARNOLD F. KOPASKA

BY
Dick, Zarley, McKee & Thomte
ATTORNEYS

IMPLEMENT TRANSPORT

Farm implements used to work the farm ground must also be transported between fields over highways and thus there is a need for a practical implement transport. The problem with many implement transports is that they are too complicated and occupy too much space such that it is impossible to pass through field gates or be operated on highways. Also, it requires too much time to convert the system for use as an implement transport and an implement in the field.

The implement transport of this invention is capable of being carried by a single wheel on the rear side and by the lift arms only of the tractor. The transport frame includes a pivotal wing frame unit at each end which is automatically pivoted upwardly as the frame is raised and is automatically pivoted downwardly as the frame is lowered. The implement such as a rotary hoe is flexibly connected by chains or the like under the transport frame and thus the implement is pulled along by the chains and is otherwise freely movable over the contour of the ground.

These and other features and advantages of this invention will become readily apparent to those skilled in the art upon reference to the following description when taken into consideration with the accompanying drawings, wherein.

Figure 1:
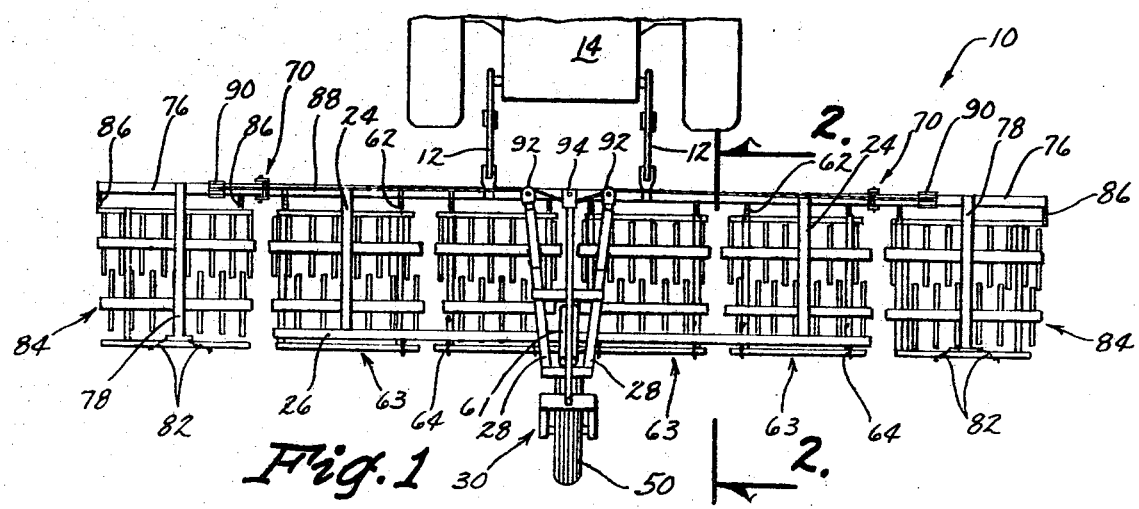
FIG. 1 is a top plan view of the implement transport in combination with a rotary hoe implement.

The implement transport is referred to in FIG. 1 generally by the reference numeral 10 and is shown connected to the lift arms 12 of a tractor 14. The arms 12 are operated by members 15 connected to powered arms 15' conventional on many tractors.

Figure 2:
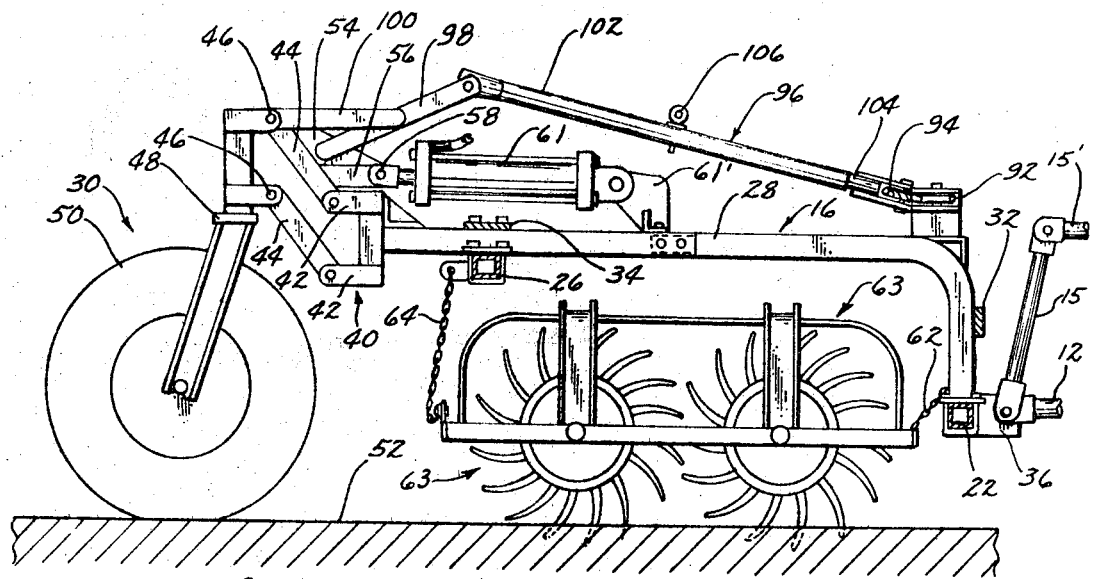
FIG. 2 is a cross-sectional view taken along line 2-2 in FIG. 1.
Figure 3:
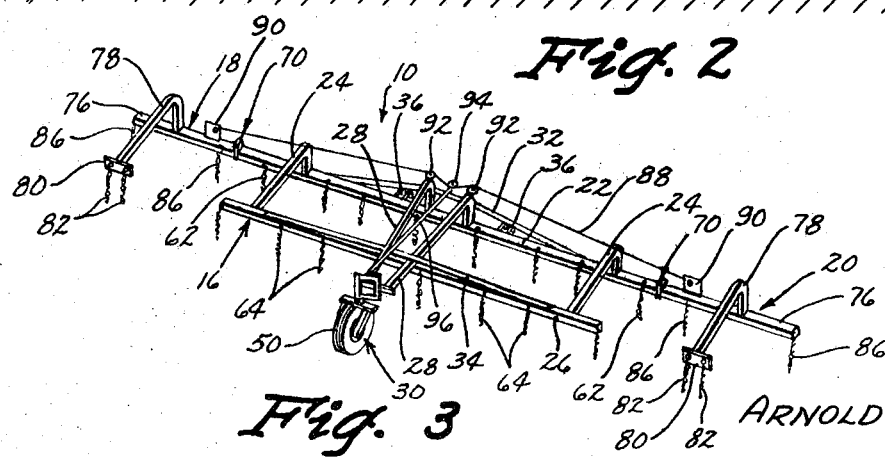
FIG. 3 is a perspective view of only the implement transport.

Referring to FIG. 3 it is seen that the implement transport 10 includes an elongated center frame section 16 with wing frame sections 18 and 20. The center section 16 includes a forward frame member 22 connected by rearwardly extending L-shaped members 24 connected to an elongated rear frame member 26 at opposite ends thereof. In the center of the frame 16 a pair of L-shaped members 28 extend rearwardly and are rigidly connected to the rear frame member 26 but also extend therebeyond for connection to a rear support wheel assembly 30 (FIG. 2).

It is seen that the forward frame member 22 and the rearward frame member 26 are reinforced by members 32 and 34 respectively extending longitudinally thereof. The forward frame 22 includes two pairs of ears 36 for detachable engagement with the tractor lift arms 12.

Figure 4:
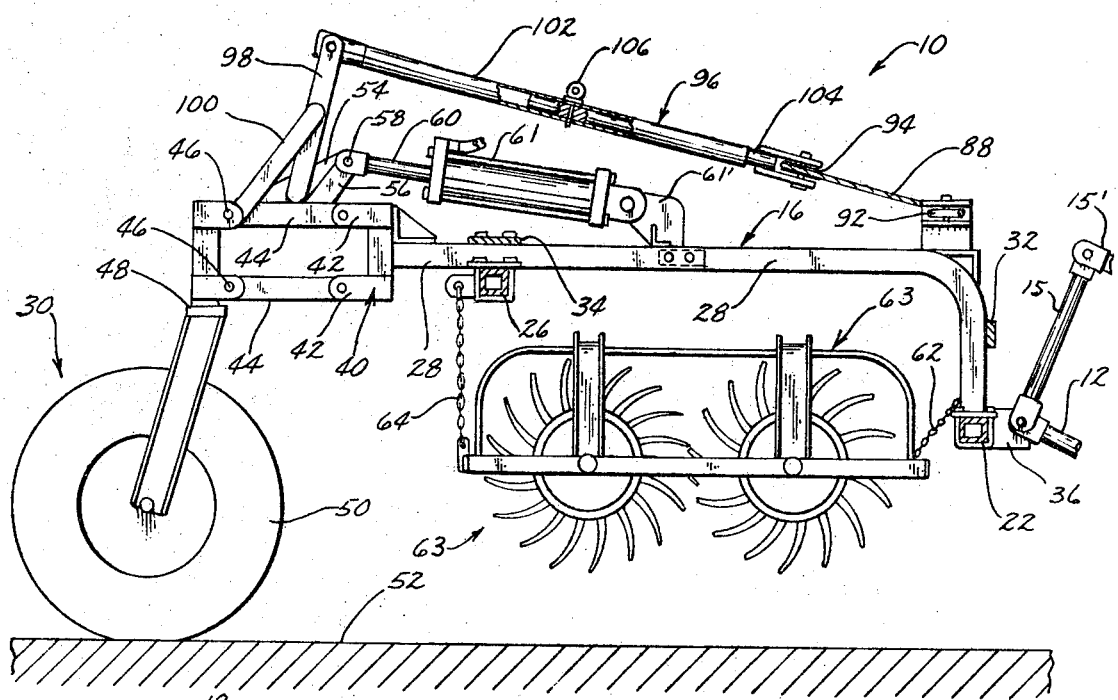
FIG. 4 is an end elevation view similar to FIG. 2 but showing the rotary hoe implement being raised by the lift mechanism on the transport.
Figure 5:
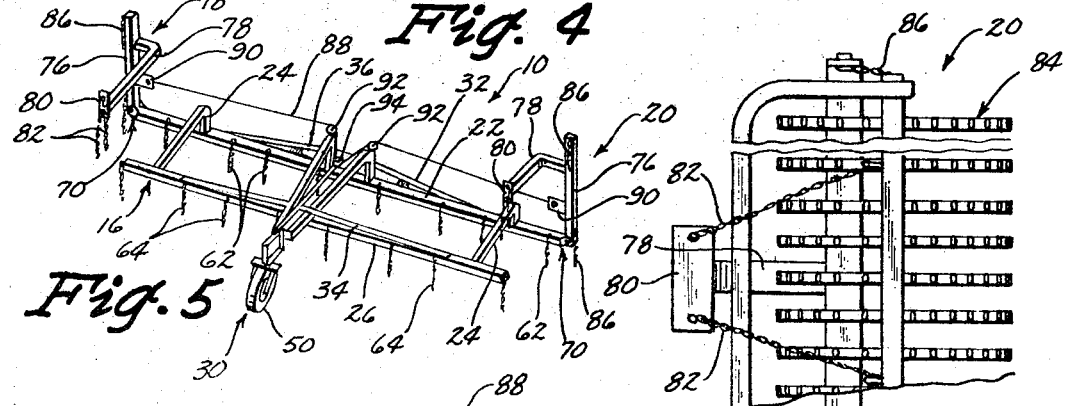
FIG. 5 is a perspective view similar to FIG. 3 but showing the wing frame units in their raised condition.

As seen in FIGS. 2 and 4 the rearwardly extending frame members 28 terminate in a mounting bracket 40 having vertically spaced-apart ears 42 which are pivotally connected to parallel links 44 which are in turn connected to a pair of vertically spaced-apart ears 46 on a vertically disposed post 48 having a wheel 50 on its lower end thereof for engaging the ground 52.

A pair of angularly disposed plate elements 54 and 56 integrally connected to the link member 44 converge at a pivotal connection 58 with the piston rod 60 of a hydraulic cylinder 61 which is anchored on an ear 61' positioned intermediate the width of the frame unit 16. Thus it is seen that as the hydraulic cylinder 61 is extended as seen in FIG. 4, the frame 16 is raised and when the cylinder 61 is contracted (FIG. 2) the frame 16 is lowered relative to the lift arms 12 and the rear wheel support 30.

As seen in the drawings, rotary hoe units 63 are positioned under the transport frame 16 and are secured along their forward edges by chains 62 and at their rear edges by chains 64. It is appreciated that any desired implement could be placed under the transport center frame 16 as desired. It is also seen that the rotary hoe units 63 are thus pulled when in operating position by the chains 62 and are free to follow the contour of the ground 52.

It is also appreciated that the forward end of the implement transport may be raised or lowered independently of the operation of the hydraulic cylinder 61 by simply operating the lift arms 12.

Referring now to FIG. 3, it is seen that a hinge 70 is provided at opposite ends of the forward frame member 22 and include upstanding ears 72 which are pivotally connected to registering ears 74 on wing frame members 76 included in the wing frame units 18 and 20. The frame member 76 also has an L-shaped rearwardly extending frame member 78 terminating in a support plate 80 which has a pair of downwardly extending lift chains 82. These lift chains 82 are connected to the rear edges of the frame of a rotary hoe unit 84 (FIG. 1). Similarly, support chains 86 are provided on the forward frame member 76 for engaging the forward edge of the frame of the rotary hoe unit 84.

To raise and lower the wing units 18 and 20, a length of cable 88 is secured at its opposite ends to upstanding ears 90 on the forward frame members 76 of the wing units 18 and 20. The cable 88 is then threaded longitudinally of the center frame 16 over pulleys 92 mounted on the members 28. At the center of the cable between members 28 a pulley 94 engages the cable as seen in FIG. 3 and is movable forwardly and rearwardly to lift and lower the wing units 18 and 20. The pulley 94 is connected to the forward end of an arm 96 which extends rearwardly where it is pivotally connected to a link member 98 rigidly secured to the plate member 54 which in turn is rigidly secured to the upper parallel link member 44. A reinforcing link member 100 extends from the member 98 and is pivotally connected at a common point with the upper parallel link member 44 to the rear support wheel assembly 30. The arm 96 as seen in FIG. 4 is comprised of a pair of telescoping portions 102 and 104 and a pin 106 for selectively extending or contracting the member 96 to the desired length to cause the wing units 18 and 20 to be raised and lowered simultaneously with the raising and lowering of the implement units 63 under the center transport frame 16. It is to be appreciated that the wing units 84 will return to their lowered condition as seen in FIG. 1 by the force of their own weight as the member 96 is moved forwardly upon contraction of the hydraulic cylinder 61.

It is to be appreciated that through the use of the novel implement transport 10 any desired implement may be placed under the transport and operated satisfactorily in the field or on the highway. Also, the minimum width for a transport is accomplished when the wing units 84 are in their raised condition. Similarly, the minimum amount of structure is required for this implement transport since it employs a single wheel 50 and is supported at its front edge by the lift arms 12 of the tractor 14.

Figure 6:
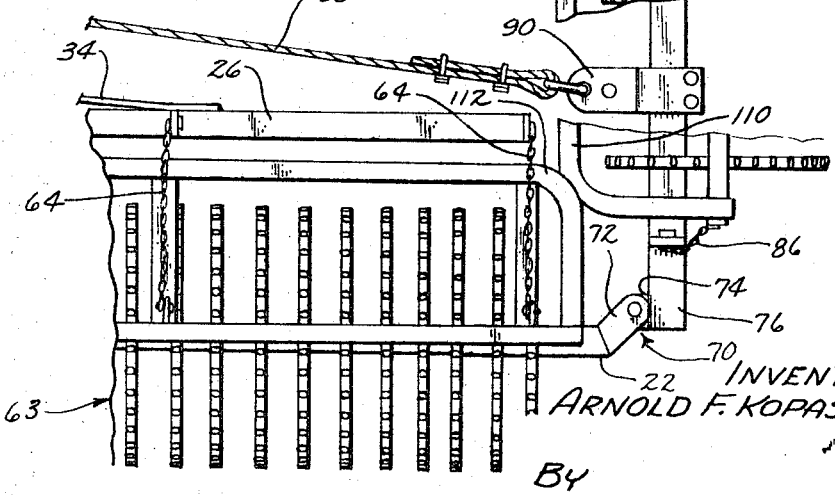
FIG. 6 is a fragmentary rear view of the implement transport and rotary hoe showing in particular a wing unit in its raised condition.

When the wing units 84 are in the raised position of FIG. 6 the rotary hoe unit carried by the wing section 20 engages along its channel frame 110 the channel frame 112 of the rotary hoe 63 adjacently positioned on the center transport section 16 thereby limiting upward pivotal movement and providing a support rest for the wing rotary hoe unit.

I claim:
1. An implement transport, comprising:
 an elongated frame having forward and rearward sides;
 fastener means disposed along the length of said frame for engagement with an implement adapted to be positioned under said frame between said forward and rearward sides;
 connection means on said forward side of said frame adapted to engage a ground engaging support means;
 connection means on said rearward side of said frame;

a wheel support connected to said rear connection means;
power means coupled to said rear connection means and said frame for raising and lowering said frame;
wing frame unit pivotally connected to each end of said elongated frame unit for pivotal movement about an axis extending transversely of the said elongated frame;
said connection means on said rear side includes a link member pivotally connected to the rear side of said frame and extends rearwardly to a pivotal connection with said wheel support, said power means being connected to said link member for pivoting it whereby said frame is raised and lowered;
cable means anchored on each of said pivotal frame units and extending longitudinally of said elongated frame into engagement with an arm secured to said link member and extending forwardly thereof whereby as said link member is pivoted in one direction and said elongated frame is raised said wing units will be pivoted upwardly and as said link member is pivoted in the opposite direction and said frame is lowered said wing units will be pivotally lowered; and
said arm extends over said power cylinder and terminates at its forward end in a pulley over which said cable extends and in turn is anchored at its opposite ends on said pivotal frame units.

2. The structure of claim 2 wherein said rear connection means includes a pair of parallel members pivotally connected to the rear side of said frame and to said wheel support at their opposite ends, said power means being coupled to one of said parallel members to pivot said parallel members for raising and lowering said frame.

3. The structure of claim 2 wherein said pair of parallel members extend rearwardly of said rear side of said frame and said wheel support extends downwardly at the rear of said pair of parallel members, and said power means includes a hydraulic cylinder anchored to said frame intermediate its front and rear sides and connected at its opposite end to said one parallel member.

4. The structure of claim 3 wherein said fastener means on said frame include flexible means whereby said implement is adapted to be loosely connected to said frame.

5. The structure of claim 1 wherein said arm includes a detachable stop element interconnecting telescopic arm portions whereby when said stop element is removed said arm portions reciprocate as said power cylinder is operated and said wing sections remain in a lowered position.

6. An implement transport, comprising:
an elongated frame having forward and rearward sides;
fastener means disposed along the length of said frame for engagement with an implement adapted to be positioned under said frame between said forward and rearward sides;
connection means on said forward side of said frame adapted to engage a ground-engaging support means;
connection means on said rearward side of said frame;
a wheel support connected to said rear connection means;
power means coupled to said rear connection means and said frame for raising and lowering said frame;
wing frame unit pivotally connected to each end of said elongated frame unit for pivotal movement about an axis extending transversely of the said elongated frame;
said connection means on said rear side includes a link member pivotally connected to the rear side of said frame and extends rearwardly to a pivotal connection with said wheel support, said power means being connected to said link member for pivoting it whereby said frame is raised and lowered;
cable means anchored on each of said pivotal frame units and extending longitudinally of said elongated frame into engagement with an arm secured to said link member and extending forwardly thereof whereby as said link member is pivoted in one direction and said elongated frame is raised said wing units will be pivoted upwardly and as said link member is pivoted in the opposite direction and said frame is lowered said wing units will be pivotally lowered;
said wheel support being connected to said rear connection means is the only ground-engaging support connected to said rear connection means and is positioned on the center line between the opposite ends of said frame to balance said frame thereon; and
said connection means on said forward side of said frame being further defined as being engaged by a pair of lift arms on a tractor which provides the only ground support for said frame on the forward side.

7. An implement transport, comprising:
an elongated frame having forward and rearward sides;
fastener means disposed along the length of said frame for engagement with an implement adapted to be positioned under said frame between said forward and rearward sides;
connection means on said forward side of said frame adapted to engage a ground-engaging support means;
connection means on said rearward side of said frame;
a wheel support connected to said rear connection means;
power means coupled to said rear connection means and said frame for raising and lowering said frame;
wing frame unit pivotally connected to each end of said elongated frame unit for pivotal movement about an axis extending transversely of the said elongated frame;
said connection means on said rear side includes a link member pivotally connected to the rear side of said frame and extends rearwardly to a pivotal connection with said wheel support, said power means being connected to said link member for pivoting it whereby said frame is raised and lowered;
cable means anchored on each of said pivotal frame units and extending longitudinally of said elongated frame into engagement with an arm secured to said link member and extending forwardly thereof whereby as said link member is pivoted in one direction and said elongated frame is raised said wing units will be pivoted upwardly and as said link member is pivoted in the opposite direction and said frame is lowered said wing units will be pivotally lowered;
said link member being further defined as being one link member in a pair of parallel link members interconnecting said wheel support and said rear side of said elongated frame;
said power means being a hydraulic power cylinder anchored to said elongated frame and extending rearwardly into pivotal engagement with said first mentioned link member; and
said connection means on said forward side of said frame being further defined as being engaged by a pair of lift arms on a tractor which provides the only ground support for said frame on the forward side.